United States Patent
Wijffels et al.

(10) Patent No.: US 10,214,238 B2
(45) Date of Patent: Feb. 26, 2019

(54) VOLTAGE COMPENSATING ANTI-CATCH ALGORITHM FOR ACTIVE FRONT STEERING SYSTEM

(71) Applicant: Ford Global Technologies, LLC, Dearborn, MI (US)

(72) Inventors: Lodewijk Wijffels, Canton, MI (US); Timothy Cannon, Millington, MI (US); Cornelius Macfarland, Garden City, MI (US); Sergio Codonesu, Heerlen (NL); David Michael Russell, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 79 days.

(21) Appl. No.: 15/347,057

(22) Filed: Nov. 9, 2016

(65) Prior Publication Data
US 2018/0127025 A1    May 10, 2018

(51) Int. Cl.
*B62D 15/02* (2006.01)
*B62D 5/04* (2006.01)
*B62D 6/00* (2006.01)
*B62D 5/00* (2006.01)

(52) U.S. Cl.
CPC .......... *B62D 15/025* (2013.01); *B62D 5/008* (2013.01); *B62D 5/0463* (2013.01); *B62D 5/0481* (2013.01); *B62D 6/002* (2013.01)

(58) Field of Classification Search
CPC .... B62D 15/025; B62D 5/0463; B62D 6/002; B62D 5/0481; B62D 5/008
See application file for complete search history.

(56) References Cited

U.S. PATENT DOCUMENTS

| | | | |
|---|---|---|---|
| 6,367,577 B2 | 4/2002 | Murata | |
| 2006/0060412 A1* | 3/2006 | Bolourchi | B62D 5/008 180/443 |
| 2008/0217099 A1 | 9/2008 | Reungwetwattana | |
| 2015/0274196 A1 | 10/2015 | Park | |
| 2016/0152265 A1 | 6/2016 | Codonesu | |

FOREIGN PATENT DOCUMENTS

| JP | 2004217045 A | 8/2004 |
|---|---|---|
| KR | 20060083578 A | 7/2006 |

* cited by examiner

*Primary Examiner* — Rodney A Butler
(74) *Attorney, Agent, or Firm* — David R. Stevens; Stevens Law Group

(57) ABSTRACT

A vehicle implements a steering anti-catch (SAC) algorithm that reduces a superimposition angle added to the steering wheel angle in order to reduce occurrence of steering catch. The superimposition angle may be determined according to an AFS system. The reduction of the superimposition angle according to the SAC algorithm is amplified when the driver is steering away from a center position, the vehicle speed is below a threshold, and a voltage for powering the power steering system is below a threshold. The amount by which the superimposition angle is reduced may be limited to a maximum reduction and may be subject to a limit in its rate of change as well.

19 Claims, 6 Drawing Sheets

VOLTAGE COMPENSATING ANTI-CATCH ALGORITHM FOR ACTIVE FRONT STEERING SYSTEM

RELATED APPLICATIONS

This application is related to U.S. application Ser. No. 14/558,427 filed Feb. 27, 2014, and entitled SYSTEMS AND METHODS FOR CORRECTING STEERING OFFSETS, which is hereby incorporated herein by reference in its entirety.

BACKGROUND

Field of the Invention

This invention relates to power steering systems and, more particularly to active power steering systems.

Background of the Invention

Active front steering (AFS) systems may continuously and intelligently alter the relationship between a driver's steering inputs at the steering wheel and the angle of the steered road wheels (i.e., the road wheel angle (RWA)) of the vehicle. An AFS system, for example, varies the degree that the road wheels turn in response to rotation of the steering wheel via a mechatronic auxiliary system. At lower speeds, this technology may reduce the amount that the steering wheel must be turned (improving performance in situations such as parking and other urban area traffic maneuvers), and at higher speeds, the system helps to prevent increased steering responsiveness resulting from increased speeds (providing improved direction stability).

Examples of AFS systems include, but are not limited to, a steer-by-wire system, in which there is no mechanical connection between the steering wheel and the steering of the road wheels, and a superimposed steering system, in which the steering angle that is generated at the steering wheel by the driver is superimposed on a steering angle generated by a servo motor, in a superimposition gear mechanism, and the sum of the two steering angles is transmitted to the steering of the road wheels. Such AFS systems provide various advantages, including, for example, the ability to change the angle of the steered road wheels without the intervention being directly perceptible to the driver.

At higher steering rates (e.g., when the driver of the vehicle is turning the steering wheel quickly), AFS systems are susceptible to a situation known as "steering catch-up," in which the power steering cannot provide sufficient assist and the driver feels an increased torque at the steering wheel. Active Front Steering (AFS) systems, for example, may provide an electronically controlled superposition angle (i.e., an overlay angle) to the steering wheel angle (SWA) provided by the driver to increase the SWA (and the effective steering speed), thereby creating a higher occurrence of steering catch-up situations.

The system and methods disclosed herein provide an improved approach for preventing steering catch-up.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

Figure 1:
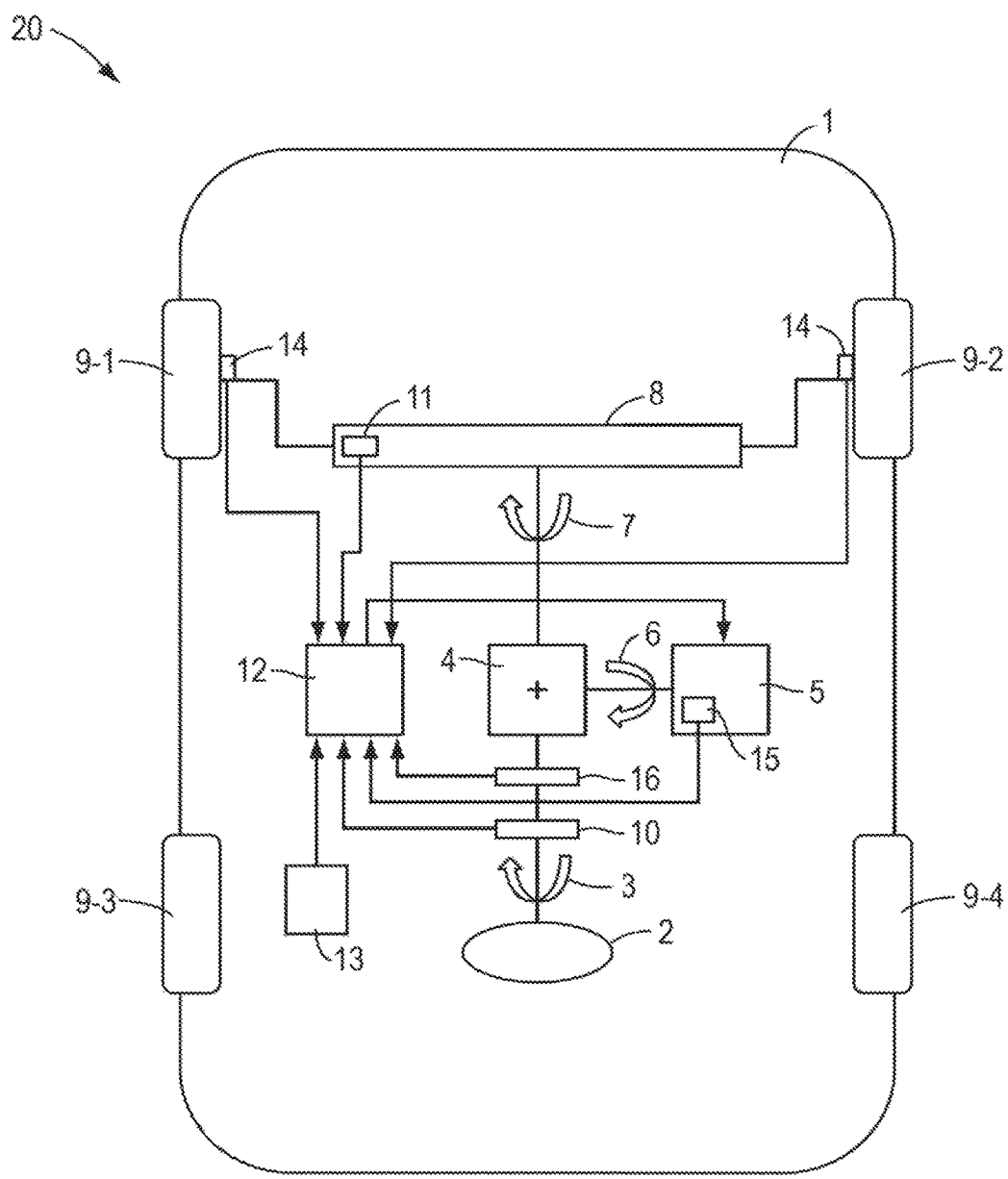
FIG. 1 is a schematic diagram showing the structure of an exemplary embodiment of a system for correcting steering offsets in a vehicle in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

An AFS system, such as, for example, Active Front Steering (AFS) provides an electronically controlled superposition of an angle to the steering wheel angle provided by the driver of the vehicle. When the driver is turning the steering wheel quickly, however, the AFS system may induce a steering catch-up situation, in which the power steering is not able to provide sufficient assist, resulting in an increased torque that is felt by the driver at the steering wheel. AFS systems that include steering anti-catch-up (SAC) features, as disclosed, for example, in German Patent No. DE 102005028153 B4, filed Jun. 17, 2005, and German Patent Application Publication No. DE 102007053816 A1, filed Nov. 12, 2007, the entire contents of which are each incorporated by reference herein, have therefore been developed to help fix this problem. Notably, during certain vehicle speeds, SAC algorithms may calculate a steering offset that will be applied to the desired road wheel angle (RWA) requested by the AFS system.

To enable correction and removal of such offsets during all driving situations, including, for example, when the driver is steering very slowly and when the steering wheel is back in the center position, the systems and methods of the present disclosure contemplate determining a steering state of the vehicle, and, subject to the determined steering state, calculating an offset reduction factor. During certain driving situations, such as those identified above, the offset reduction factor will be applied by the SAC to reduce the chance the driver will experience an undesirable torque at the steering wheel.

In accordance with various embodiments, for example, determining a steering state of the vehicle may include selecting the steering state from one of the following: a steering slowly state, a steering away from center state, and a steering toward center state. The offset reduction factor is calculated, for example, when the determined steering state is either the steering toward center state or the steering slowly state. During such selected states, the offset reduction factor may be calculated, for example, based on a desired road wheel angle (RWA) that is requested by the AFS system (i.e., from the VGR function) and a steering offset that is generated by the AFS system (i.e., via the SAC algorithm). The offset reduction factor may then be applied, for example, to the next desired RWA that is requested by the AFS system to generate a new (i.e., corrected) steering offset.

As used herein, the "steering state" refers to the relative position and direction of movement of the steering wheel at a particular point in time (i.e., the steering situation created by the driver of the vehicle at a given point in time). As above, in various embodiments, the steering state is chosen from one of three different states that indicate how the driver of the vehicle is presently directing/controlling rotation (or movement) of the steering wheel. As used herein, the "steering slowly state" refers to a state in which the driver is causing the steering wheel to rotate (e.g., turning the steering wheel) at a speed that is within the sensor noise region of the steering wheel velocity sensor. In other words, when in the steering slowly state, there is no discernable rotation of the steering wheel, either because the driver is not turning the steering wheel (i.e., the steering wheel is in its center position and the vehicle is driving straight ahead), or the driver is turning the steering wheel so slowly that the movement is undetectable by the steering wheel velocity sensor. As used herein, the "steering away from center" state refers to a state in which the driver is turning the steering wheel (i.e., to the left or right) at a detectable speed away from its center position, and the "steering toward center" state refers to a state in which the driver is turning the steering wheel (i.e., to the left or right) at a detectable speed toward its center position. As will be understood by those of ordinary skill in the art, these exemplary states are generally intended to encompass the different steering situations present during slow speed driving (e.g., during parking and rolling) when the driver is most likely to have turned the steering wheel quickly and activated the SAC algorithm, which generates a steering offset that must be corrected. As will be further understood, however, these states are exemplary only and not intended to limit the scope of the present disclosure and claims.

Various exemplary embodiments of the present disclosure contemplate using various vehicle sensors to provide signals to a controller, and the controller then utilizes the signals to both determine the steering state and to calculate the offset reduction factor. The vehicle sensors may include existing vehicle sensors when available, such as, for example, active steering sensors, such as, for example AFS sensor(s), antilock brake system (ABS) sensor(s), steering wheel angle sensors, steering wheel velocity sensors, wheel speed sensors, vehicle speed sensors, and an actuator angle sensor, a pinion angle sensor, or any combination thereof. Because most existing vehicles already contain the above sensors, certain embodiments of the present disclosure contemplate using only existing vehicle sensors. Embodiments of the present disclosure also contemplate systems and methods that include and utilize additional sensors as needed to provide the signal inputs used in the systems and methods of the present disclosure.

To determine the steering state, the present disclosure contemplates determining a road wheel velocity (RWV) based, for example, on a signal received from a steering wheel angle sensor associated with the steering wheel of the vehicle, and comparing the determined RWV to a threshold RWV. The threshold RWV may be a lower limit of the RWV, such that if the determined RWV is below the threshold, the determined RWV may be within the sensor noise region of a steering wheel velocity sensor (i.e., within the steering slowly state). In other words, the threshold RWV represents the speed below which the motion of the steering wheel is no longer detectable by the steering wheel velocity sensor. Thus, if the determined RWV is less than the threshold RWV, the steering wheel is determined to be in the steering slowly state. And, if the determined RWV is above or equal to the threshold RWV, the steering wheel is determined to be in either the steering away from center state or the steering toward center state, based, for example, upon the sensed steering wheel angle. That is, if the determined RWV is above or equal to the threshold RWV, then the motion of the steering wheel is detectable by the steering wheel velocity sensor, and determined to be either moving away from the center or toward the center based on a comparison of the road wheel angle (RWA), which is determined based on the sensed steering wheel angle as described below, and the RWV. In accordance with various embodiments, for example, the steering wheel is determined to be in the steering away from center state, if the sign of the RWA is the same as the sign of the RWV; and the steering wheel is determined to be in the steering toward center state, if the sign of the RWA is different than the sign of the RWV.

Those of ordinary skill in the art will understand that the threshold RWV is, therefore, at least partially dependent on the quality of the steering wheel velocity sensor and the sensor noise region associated with the sensor. In various embodiments, for example, the threshold RWV is about 1.4 degrees/second.

In accordance with various embodiments, the RWV may be determined (i.e., for comparison with the threshold RWV) based on the RWA. The RWV may be determined, for example, by calculating the time derivative of the RWA. The RWV may be determined by various methods and using various inputs, including, for example, the steering wheel velocity multiplied by the overlay gain factor provided by the AFS multiplied by the steering gear ratio, or using the measured pinion angle multiplied by the steering gear ratio, as would be understood by those of ordinary skill in the art.

To calculate the offset reduction factor, for example, when the determined steering state is the steering slowly state or the steering toward center state, the present disclosure contemplates capturing the present desired RWA requested by the AFS system and the present steering offset generated by the AFS system (e.g., by the SAC feature), and dividing the captured steering offset by the captured desired RWA. In accordance with various embodiments of the disclosed systems and methods, a new (i.e., corrected) steering offset may then be calculated based on the offset reduction factor and the new desired RWA (i.e., the next desired RWA that is requested by the AFS system). As used herein, the term "desired road wheel angle" or "desired RWA" refers to the output of the AFS variable gear ratio (VGR) feature, or the desired pinion angle. In other words, the desired RWA is the sum of two steering angles (i.e., a steering angle that is generated at the steering wheel by the driver and an overlay angle that is generated by the AFS servo motor), which is transmitted by the AFS to the steering of the road wheels.

Accordingly the present disclosure contemplates estimating the desired RWA based on the steering wheel angle (SWA). The desired RWA may be estimated, for example, by adding the overlay angle generated by the AFS to the steering wheel angle that is generated by the driver. The RWA may be estimated, however, via various methods and using various inputs, including, for example, the pinion angle (via, e.g., a pinion angle sensor) multiplied by the steering ratio, as would be understood by those of ordinary skill in the art.

Turning now to the drawings, FIG. 1 shows the structure of an exemplary embodiment of a system 20 for correcting steering offsets in accordance with the present disclosure. A motor vehicle 1 includes an AFS system (shown by individually labeled components). In use, a driver of the motor vehicle 1 may control the direction of motion of the motor vehicle 1 via a steering wheel 2, thereby deflecting (i.e., turning) the steering wheel 2 by an amount equal to a steering wheel angle 3. The AFS system, may include, for example, a superimposition gear mechanism 4, which superimposes a superimposition angle 6 (also referred to herein as an overlay angle 6) on the steering wheel angle 3 via an actuator, such as, for example, an electric motor 5. Accordingly, the electric motor 5 may be referred to as an overlay motor 5. A resulting compensated steering angle 7, which includes the steering wheel angle 3 and the superimposition angle 6, moves a steering gear 8, which moves two of the wheels 9-1, 9-2, 9-3, 9-4 into a desired position (i.e., the desired RWA). As shown in the embodiment of FIG. 1, in a vehicle having front axle steering, the compensated steering angle 7 will move the steering gear 8 to move the front wheels 9-1, 9-2 (i.e., the steered road wheels) of the vehicle 1. The steering gear 8 may include a power rack and pinion steering system, which may be a rack power assist system that is powered hydraulically or a column electric power assisted system (EPAS) powered by an electric motor. The steering gear 8 may provide a power assist to move the front wheels 9-1, 9-2 to a position corresponding to the compensated steering angle 7.

In various embodiments of the present disclosure, the system 20 for correcting steering offsets may include one or more preexisting vehicle sensors embodied within various subsystems of the vehicle 1, and a controller 12 that is configured to receive signals from the sensors, determine a steering state based on the signals, and calculate an offset reduction factor based on the signals and the steering state. In various embodiments, for example, the AFS system includes a steering wheel angle sensor 10 that may detect the steering wheel angle 3 for determination of the desired RWA.

The system 20 may further include various additional sensors used to determine the desired RWA, the speed of the vehicle 1, and/or the speed of the steering wheel 2, including, for example, an actuator angle sensor 15 that may detect the superimposition angle 6, a pinion angle sensor 11, a vehicle speed sensor 13, wheel speed sensors 14 associated with each of the front wheels 9-1, 9-2 of the vehicle 1 and/or a steering wheel velocity sensor 16. Such sensors may be present in various additional subsystems of the vehicle 1, including, for example, the ABS system (not shown).

Those of ordinary skill in the art would understand that the system 20 for correcting steering offsets illustrated in FIG. 1 is exemplary only and intended to illustrate one embodiment of the present disclosure. Accordingly, systems and vehicles encompassing such systems in accordance with the present disclosure may have various types, numbers and/or configurations of actuators, controllers, and/or sensors without departing from the scope of the present disclosure and claims. For example, although the system 20 illustrated and described with reference to FIG. 1 includes an AFS system, embodiments of the present disclosure contemplate correcting steering offsets in conjunction with any type and/or configuration of AFS system.

As shown in FIG. 1, the controller 12 receives signals from at least the steering wheel angle sensor 10, and both determines a steering state of the steering wheel 2 and, subject to the determined steering state, calculates an offset reduction factor based on the signals, as set forth in the following exemplary embodiments. The controller 12 may include, for example, an existing vehicle controller such as the Electronic Control Unit (ECU) of the vehicle 1, or a dedicated controller, or control may be distributed among more than one vehicle controller, as would be understood by one ordinarily skilled in the art.

As above, to determine the steering state of the steering wheel 2, the controller 12 is configured to calculate a road wheel velocity (RWV) based on the steering wheel angle 3. The controller 12 may then compare the calculated RWV to a threshold RWV to determine the steering state. In various embodiments, based on this comparison, the controller 12 chooses between a steering slowly state, a steering away from center state, and a steering toward center state.

When the determined steering state is the steering away from center state (i.e., when the calculated RWV is greater than or equal to the threshold RWV and it is detected that the steering wheel is moving away from its center position), the controller 12 is configured to calculate a new steering offset, as disclosed in detail, for example, in German Patent No. DE 102005028153 B4 and German Patent Application Publication No. DE 102007053816 A1, the entire contents of which are incorporated by reference herein. For example, to calculate a steering offset, the controller 12 may be configured to compare a steering wheel velocity (SWV) (e.g., from the steering wheel velocity sensor 16) to a threshold SWV. In the same manner, when the determined steering state is the steering away from center state, the controller 12 may be configured to calculate a new steering offset by comparing the SWV to a threshold SWV, and adjusting the steering offset presently being applied by the SAC algorithm based on the comparison. In various embodiments, for example, the controller 12 may be configured to increase the steering offset when the SWV is greater than or equal to the threshold SWV and to decrease the steering offset when the SWV is less than the threshold SWV.

The threshold SVW may be chosen, for example, to represent a speed above which the steering wheel is considered to be turning fast, thereby requiring an additional offset to compensate for the steering catch-up created by the AFS due to the fast steering. In accordance with various embodiments, for example, the threshold SVW may be about 400 degrees/sec.

When the determined steering state is the steering away from center state, to help ensure that a steering offset is only applied during situations that may create steering catch-up (i.e., when the driver steers quickly while driving slowly), various additional embodiments contemplate allowing the SAC to increase the steering offset (i.e., apply an additional steering offset) only during an established vehicle speed range (i.e., a SAC working range). In other words, to prevent the SAC algorithm from increasing the steering offset when the driver is not driving slowly, the controller 12 may be configured to increase the steering offset only when a speed of the motor vehicle 1 is determined to be less than a threshold speed. In various embodiments, for example, the SAC working range may be from about 0 to about 20 kilometers per hour (kph), and the controller 12 may be configured to increase the steering offset only when the speed of the motor vehicle 1 is less than about 20 kph.

When the determined steering state is the steering toward center state (i.e., when the calculated RWV is greater than or equal to the threshold RWV and it is detected that the steering wheel is moving toward its center position) or the steering slowing state (i.e., when the calculated RWV is less than the threshold RWV), the controller 12 is configured to calculate an offset reduction factor to reduce and/or remove the current steering offset applied by the SAC (e.g., the steering offset that is applied when the determined steering state is the steering away from center state). In various embodiments, as discussed above, the controller 12 is configured to capture and store, for example, in a memory (not shown) associated with the controller 12, both the present desired RWA requested by the AFS system and the present steering offset generated by the AFS system (i.e., via the SAC), and calculate the offset reduction factor based on the captured values. As above, in accordance with various embodiments, the controller 12 may calculate the offset reduction factor by dividing the captured steering offset by the captured desired RWA (or by multiplying the captured steering offset by the captured RWA if the captured RWA is in fractional form). The controller 12 may then calculate a new (i.e., corrected) steering offset by multiplying the offset reduction factor by the new desired RWA (i.e., the next desired RWA that is requested by the AFS system). The new steering offset may then be applied to the desired RWA to change an angle of the vehicle's steered road wheels 9-1, 9-2.

To ensure that the steering offset is not increased, for example, if the desired RWA increases, in various exemplary embodiments, the controller 12 may be further configured to compare the new desired RWA to the captured RWA, and maintain the captured steering offset if the new desired RWA is greater than or equal to the captured desired RWA.

Figure 3A:
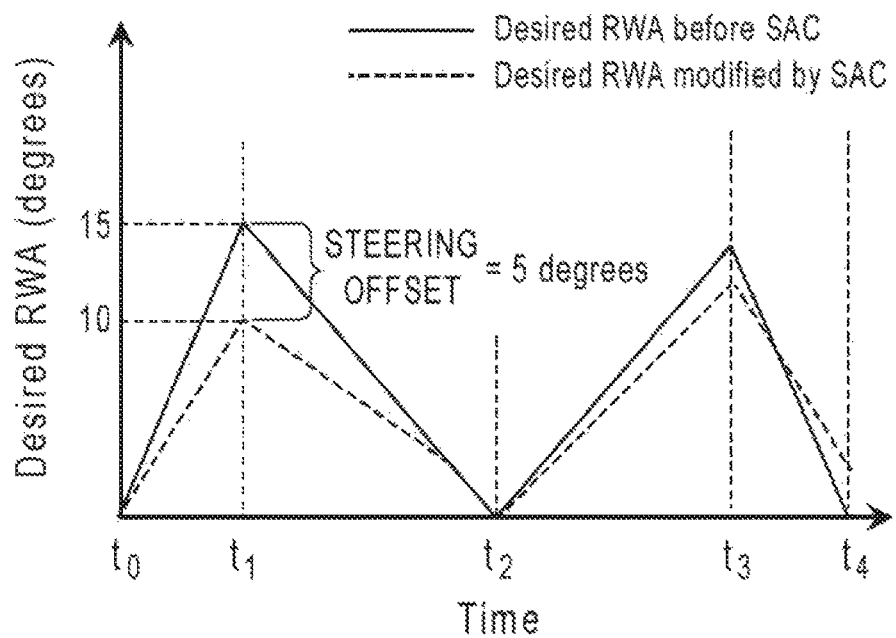
FIG. 3A is a schematic representation of a simulation run of an AFS system incorporating a conventional SAC algorithm.
Figure 3B:
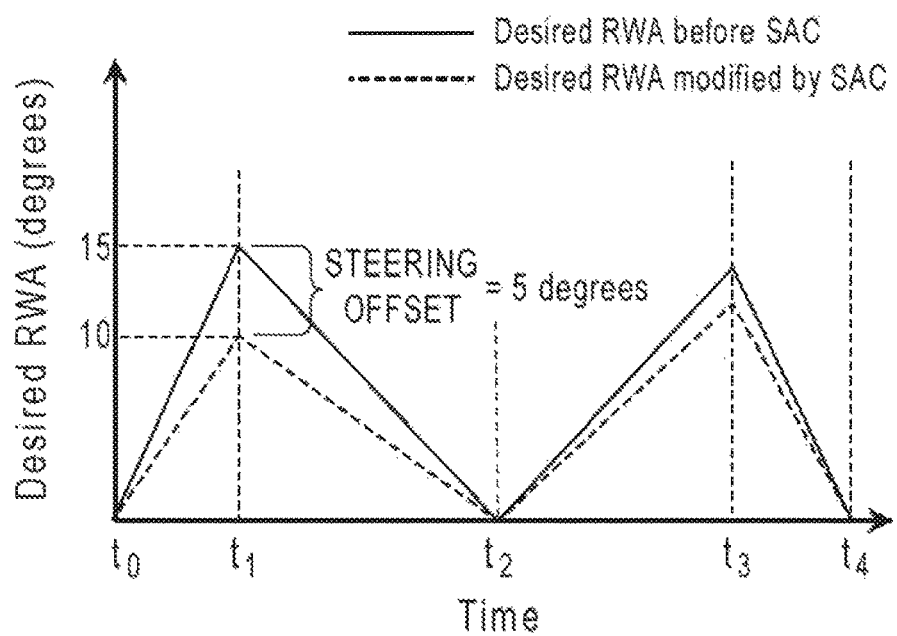
FIG. 3B is a schematic representation of a simulation run of an AFS system incorporating a SAC algorithm in accordance with the present disclosure.

In this manner, as illustrated in FIG. 3B, systems in accordance with the present disclosure may effectively reduce and remove steering offsets even when the driver is steering very slowly (i.e., in the undetectable range of the steering wheel velocity sensor 16) and when the steering wheel is moving back toward and into the center position (e.g., at times $t_2$ and $t_4$ of FIG. 3B, wherein the desired RWA is zero degrees).

In contrast, as shown in FIG. 3A, current SAC algorithms, which are generally dependent on steering speeds to determine offset calculation and correction, are limited to offset reduction during periods of slow steering (i.e., when the system detects that the driver is steering at a slow rate via a steering wheel velocity sensor). Accordingly, as illustrated in FIG. 3A, such systems may, therefore, fail to remove offsets that are present, for example, when the driver is steering very slowly (i.e., at a speed that cannot be detected by looking at the steering wheel velocity signal), and when the steering wheel is back in the center position (e.g., at times $t_2$ and $t_4$ of FIG. 3A, wherein the desired RWA is zero).

Figure 2A:
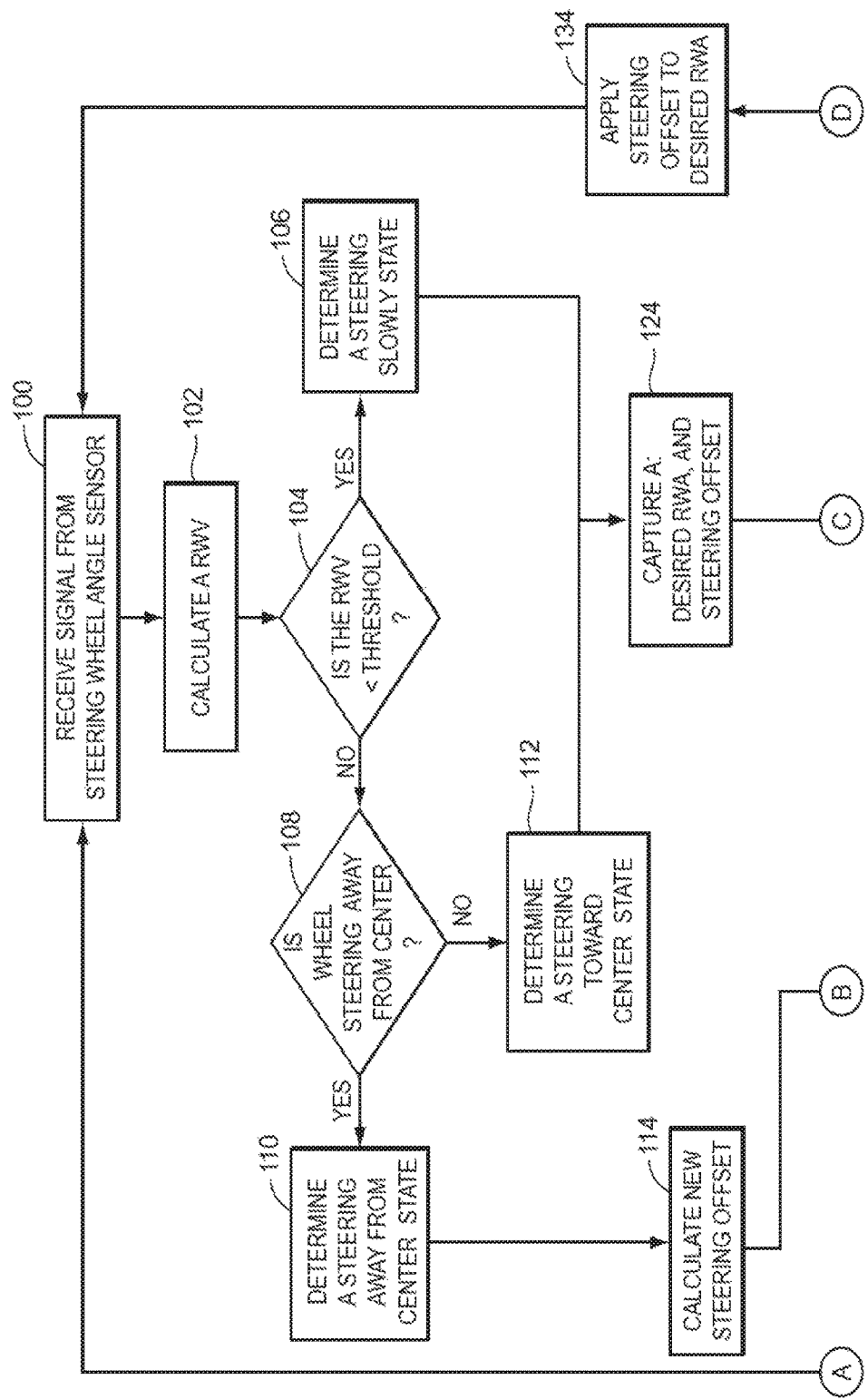
FIGS. 2A and 2B show a flow chart illustrating an exemplary embodiment of a method for correcting steering offsets in accordance with the present disclosure.
Figure 2B:
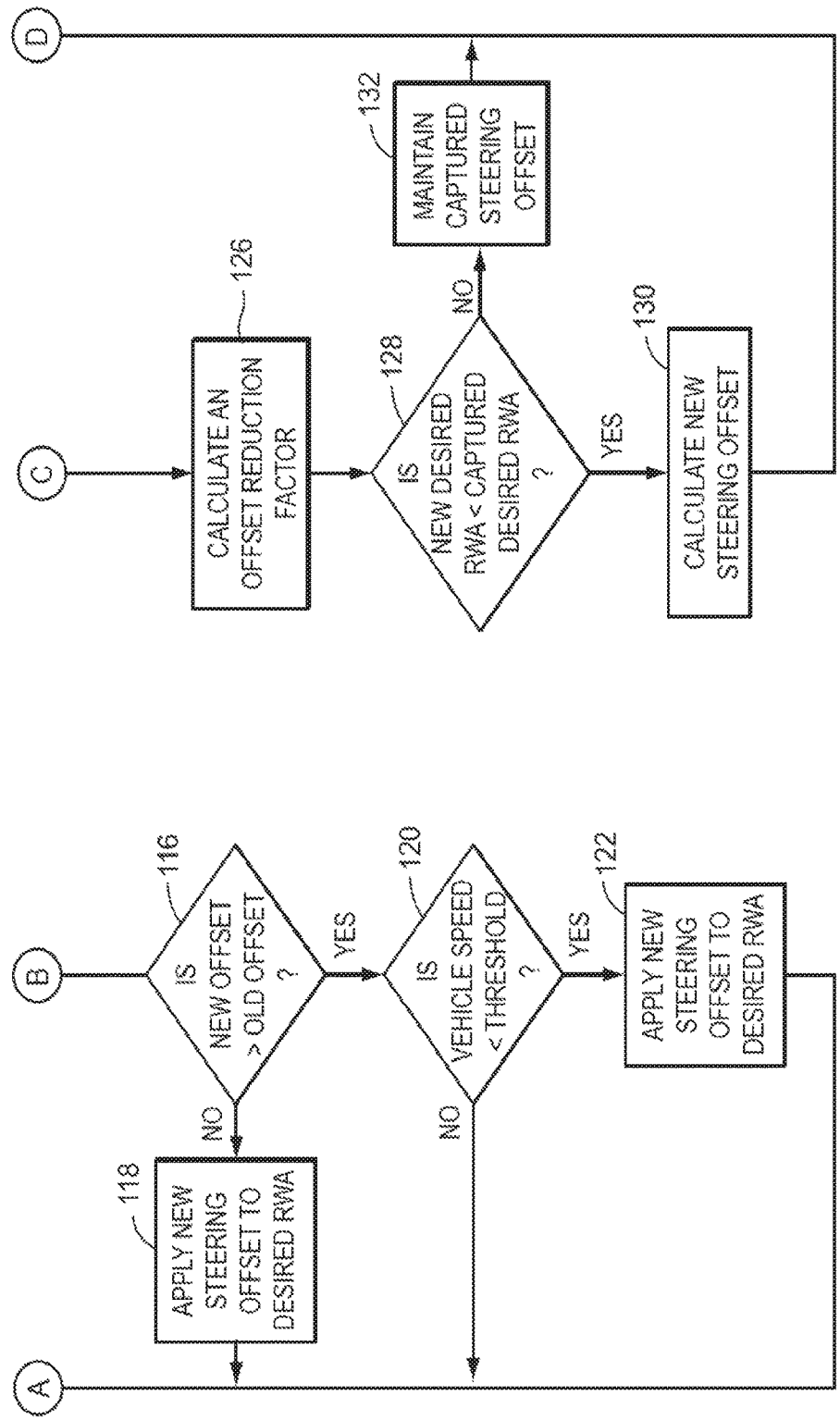

FIGS. 2A and 2B show a flow diagram depicting an exemplary embodiment of a method for correcting steering offsets in accordance with the present disclosure. The method begins, for example, when a vehicle, such as, for example, the vehicle 1 of FIG. 1, including the above described system 20, is started; and ends, for example, when the vehicle 1 is turned off. The method may be, for example, cyclical and constantly run as the vehicle is driven to continuously calculate and correct steering offsets (i.e., to compensate for steering catch-up).

As illustrated in FIGS. 2A and 2B, in various embodiments, for example, at step 100, a controller 12 may receive and store signals corresponding to various vehicle characteristics, including, but not limited to, a steering wheel angle 3 of the vehicle 1. The controller 12 may then determine a steering state based on the steering wheel angle 3. At step 102, for example, the controller 12 may calculate a road wheel velocity (RWV) based on the steering wheel angle 3, and, at steps 104-112, determine the steering state based on the calculated RWV. As above, in various embodiments, at step 104, the controller 12 may compare the calculated RWV to a threshold RWV (i.e., representing the speed below which the motion of the steering wheel is no longer detectable by a steering wheel velocity sensor). If the determined RWV is less than the threshold RWV, at step 106, the steering wheel 2 is determined to be in the steering slowly state. And, if the determined RWV is greater than or equal to the threshold RWV, at step 108, the steering wheel 2 is determined to be in either the steering away from center state or the steering toward center state, based, for example, upon the sensed steering wheel angle 3. For example, if the sign of the steering wheel angle 3 (or the RWA) is the same as the sign of the SWV (or the RWV), at step 110, the steering wheel 2 is determined to be in the steering away from center state; and if the sign of the steering wheel angle 3 (or the RWA) is different than the sign of the SWV (or the RWV), at step 112, the steering wheel 2 is determined to be in the steering toward center state.

If the determined steering state indicates that the vehicle 1 is in the steering away from center state, at step 114, the controller 12 may calculate a steering offset. As above, in various embodiments, for example, the controller 12 may calculate a new steering offset by adjusting (i.e., increasing or reducing) the present steering offset based, for example, on a steering wheel velocity (SWV) of the steering wheel 1. If the new steering offset is less than the old steering offset (i.e., if the steering offset was reduced), the controller 12 may then apply the new steering offset to the desired RWA, as illustrated in steps 116 and 118. To help ensure, however, that a steering offset is only applied during situations that may create steering catch-up (i.e., when the driver steers quickly while driving slowly), in various additional embodiments, at step 120, the controller 12 may confirm that the vehicle 1 is traveling within the working range of the SAC algorithm prior to applying an increased steering offset. As illustrated in step 120, if a speed of the vehicle 1 is less than a threshold speed, at step 122, the controller 12 may apply the new increased steering offset to the desired road wheel angle (RWA) requested by the AFS. Thus, if the speed of the vehicle 1 is greater than or equal to the threshold speed, the steering offset may only be maintained or reduced.

If the determined steering state indicates that the vehicle 1 is in the steering slowly state or the steering toward center state, the controller 12 calculates an offset reduction factor. In various embodiments, for example, if the determined steering state indicates that the vehicle 1 is in the steering slowly state or the steering toward center state, at step 124, the controller 12 may capture and store the present desired RWA requested by the AFS and the present steering offset generated by the AFS. At step 126, the controller 12 may then calculate the offset reduction factor by dividing the captured steering offset by the captured RWA (or by multiplying the captured steering offset by the captured RWA if the captured RWA is in fractional form).

The controller may then adjust the steering offset based on the calculated offset reduction factor and the new desired RWA (i.e., the next desired RWA that is requested by the AFS system). At step 130, for example, the controller 12 may calculate a new (i.e., corrected) steering offset by multiplying the offset reduction factor by the new desired RWA (i.e., the next desired RWA that is requested by the AFS system). As above, to ensure, however, that the steering offset is not increased, for example, if the desired RWA increases, in various embodiments, as illustrated in step 128, the controller 12 may first compare the new desired RWA to the captured RWA, and, if the new desired RWA is greater than or equal to the captured desired RWA, instead maintain the captured steering offset as illustrated at step 132.

At step 134, the controller 12 may then apply the steering offset (either the new steering offset or the captured steering offset) to the next desired RWA requested by the AFS system to change an angle of the steered road wheels (e.g., the front wheels 9-1 and 9-2) of the vehicle 1.

As above, the controller 12 may include, for example, an existing vehicle controller such as the Electronic Control Unit (ECU) of the vehicle 1, or a dedicated controller, or control may be distributed among more than one vehicle controller, as would be understood by one ordinarily skilled in the art. The controller 12 is programmed to run an algorithm to correct steering offsets based, for example, on the flow chart of FIGS. 2A and 2B.

Furthermore, the method described above can be performed in one or more devices of the vehicle. For example, the method can be performed by a control device of an AFS system, such as a central control unit (not shown) or controller. The control device can be implemented within any element of the AFS system such as a control unit. Alternatively, the control device can be a separate device from any of the above-described AFS system elements. The control device can include a storage element such as a disk drive, flash drive, memory circuit, or other memory device. The storage element can store software, which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

Figure 4A:
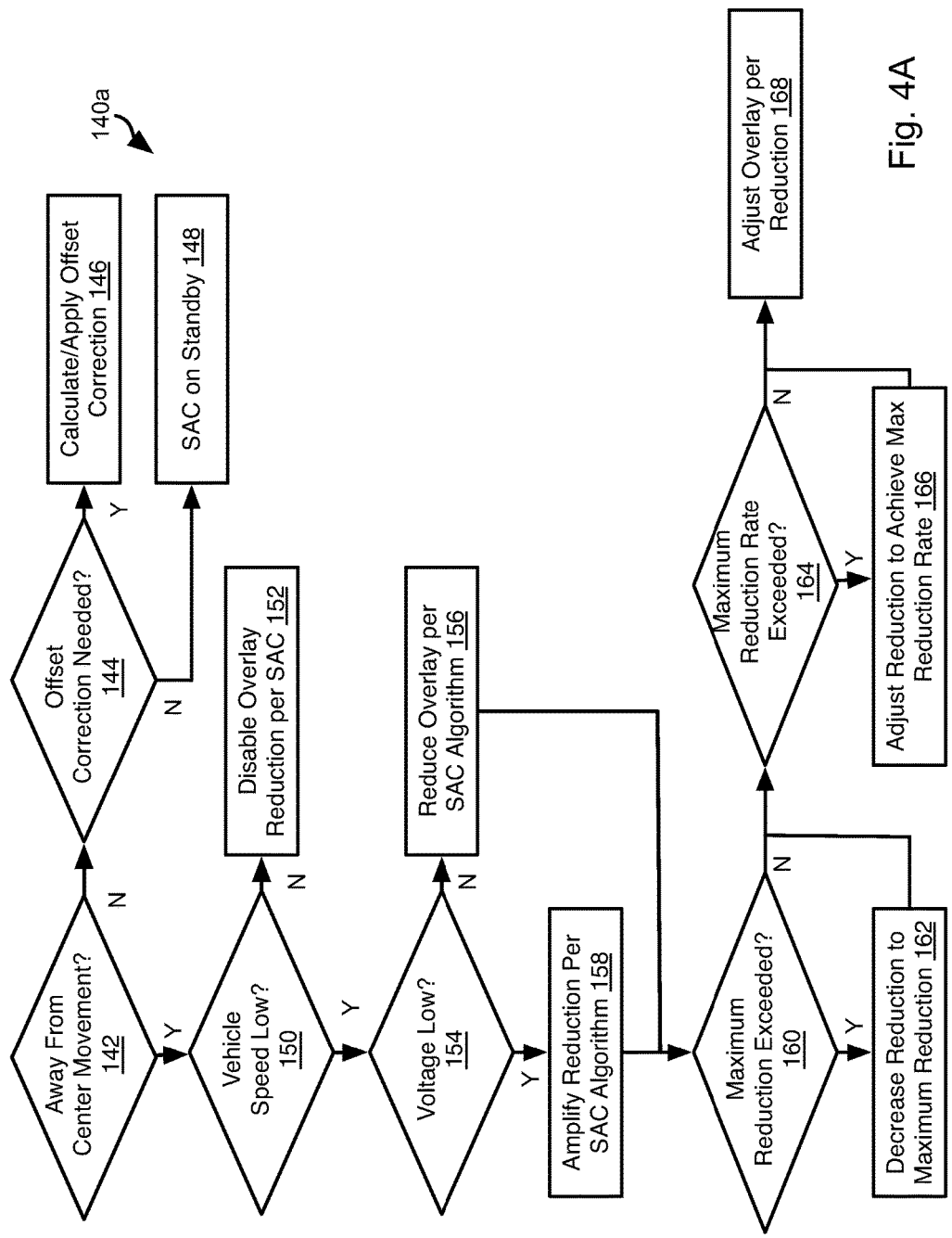
FIG. 4A is a process flow diagram of a method for selectively enabling a SAC algorithm in accordance with an embodiment of the present invention.

Referring to FIG. 4A, higher steering rack speeds due to ratio changes from AFS systems can lead to increased occurrences of insufficient torque assist from the steering assist system. As described above, an SAC algorithm may be used to reduce the superimposition angle at high steering wheel speeds in order to reduce rack speeds and decrease the instances of driver-induced steering catch. In some embodiments, an SAC algorithm may be selectively enabled and disabled according to the illustrated method 140a. The method 140a may be executed by the controller 12.

In particular, as described below, the disclosed method may be used to take into account reduced assist availability due to low voltage levels. The steering gear 8 cannot provide the same assist levels at all voltages and so the system may be more or less likely to induce catch due during low voltage situations. Currently, a larger EPAS motor or reduced AFS system performance is required to avoid steering catch during low-voltage events. Using the method 140a, the rare co-occurrence of low voltage and steering catch may be dealt with without requiring a steering gear 8 including a larger motor while still reducing occurrence of degradation of AFS system performance.

The method 140a may be executed in response to detecting steering wheel movement, e.g. an output of the steering wheel angle sensor 10 that indicates movement of the steering wheel.

The method 140a may include evaluating 142 whether the steering wheel movement is away from the center position, i.e. urging the steering gear 8 away from the center position toward the endstops of the steering gear 8.

If the steering wheel movement is determined 142 to be movement toward the center, the method 140a may include evaluating 144 whether offset correction is needed. And, if so, calculating and applying 146 an offset correction. As noted above, where adjustments have been made to prevent steering catch, these adjustments need to be reversed during movement toward the center such that the on-center position for the steering wheel occurs when the RWA is also zero. Steps 146 and 148 may include executing the method of FIGS. 2A and 2B for removing offsets.

If no offset correction is found 144 to be needed during toward-center movement, then the SAC algorithm may remain on standby 148 until an offset correction is found 144 to be needed or away from center movement is found 142 to be occurring and other conditions for reduction of the overlay angle 6 are detected as described below.

If away from center movement is found 142, the method 140a may include evaluating 150 whether the vehicle speed is low. For example, a speed below 20 kph, preferably below 10 kph, may be an acceptable value. In general, when a vehicle is moving quickly, steering movements are smaller and steering catch is highly improbable. If the vehicle speed is not found 150 to be low, then reduction of the overlay angle 6 according to the SAC algorithm is disabled 152. Accordingly, the overlay angle 6 will be determined by the AFS algorithm without reduction according to the SAC algorithm.

If the steering movement is found 146 to be away from center the vehicle speed is found 150 to be low, the method 140a may further include evaluating 154 whether a battery voltage is low. This value is typically available to the ECU (electronic control unit) in a modern vehicle. The voltage evaluated at step 154 may include the voltage at inputs to the electric motor 5 or to the steering gear 8. In some embodiments, the voltage evaluated at step 154 may be a filtered version of the measured voltage. The measured voltage may be subject to noise and temporary fluctuations that do not affect power available to the motor 5. Accordingly, the measured voltage may be filtered in order to ensure that a detected low voltage is sufficient to impact performance of the motor 5. Filtering the measured voltage may include low-pass filtering the measured voltage to obtain the filtered voltage. The cutoff frequency of the low-pass filter may be selected experimentally for a given system such that the situations in which steering catch can occur is acceptably low.

If away from center movement is found 142, the vehicle speed is found 150 to be low, and the voltage is not found 154 to be low, then an SAC algorithm may be used to reduce 156 the overlay angle 6 and prevent steering catch. The SAC algorithm that is used subject to the conditions of steps 142-154 may be any anti-catch algorithm known in the art. The SAC algorithm may include the methods described above with respect to FIGS. 2A and 2B or the SAC algorithms of the documents incorporated herein by reference.

If the conditions of steps 142 and 150 are found to be true and the voltage is found 154 to be low, the overlay angle 6 may be reduced 158 according to the SAC algorithm with amplification in order to increase the amount of the reduction to compensate for the reduced voltage. In some embodiments, where the voltage is found 154 to be low and the conditions of steps 142 and 150 are found to be met, the reduction determined at step 158 is an amplified reduction with respect to a reduction applied 156 in the absence of detecting 154 a low voltage. For example, the amplified reduction in the overlay angle 6 with respect to the AFS superimposition angle may result in a reduction in the overlay angle 6 where the unamplified SAC algorithm does not reduce the overlay angle for the same steering state. The amplified reduction may be greater than the reduction to the AFS overlay angle 6 applied by the unamplified SAC algorithm for the same steering state in the absence of detecting 154 low voltage. For example, the amplified reduction may be computed according to an equation of the form $M*A_{SAC}+B$, where $A_{SAC}$ is the overlay reduction according to the unamplified SAC algorithm and M and B are amplification factors computed based on the steering state. Other functions may also be used to compute the amplification of the overlay reduction according to the unamplified SAC algorithm.

In some embodiments, the amount of reduction in the superimposition angle imposed by the amplified SAC algorithm from step 158 or the unamplified SAC algorithm of step 156 may be subject to a limit. If the reduction of step 156 or step 158 is found 160 to exceed a maximum reduction, then the reduction will be decreased 162 to the maximum reduction. Imposing a maximum reduction ensures that steering movements do not become too exaggerated, i.e. requiring many turns of the steering wheel for a small change in RWA, and providing improved feedback and road feel for the driver.

In some embodiments, in order to avoid perceptible fluctuations in steering effort, the reduction of the superimposition angle may be rate-limited, i.e. it may only be changed at a rate of X degrees per minute, where X is a maximum rate of change. Accordingly, the adjustment as determined at step 156, step 158, or step 162 may be evaluated with respect to the rate limit. Specifically, any reduction to the overlay angle 6 applied in a previous iteration of the method 140a may be recorded. If the value of the reduction following steps 156-162 is found 164 to result in a change that exceeds the maximum reduction rate, then the method 140a may include adjusting 166 the reduction such that the maximum reduction rate is achieved.

For example, if a reduction R1 is applied in a first iteration of the method 140a and a reduction R2 is determined according to steps 156-162 an elapsed time dT following application of R1, the absolute value of (R2−R1)/dT may be compared to the maximum reduction rate. If the maximum reduction rate is found 164 to be exceeded, then the reduction maybe set equal to R1+Sign(R2−R1)*X*dT.

The overlay angle 6 as determined by the AFS algorithm may then be adjusted 168 by subtracting the reduction from the overlay angle determined by the AFS algorithm. The reduction that is actually used may then be used in a subsequent iteration to determine whether the maximum rate will be exceeded, as outlined above.

Stated mathematically, for a given captured steering wheel offset $A_{SW}$, the AFS algorithm will cause motor 5 to achieve an additional overlay angle 6 or superimposition angle, $A_{AFS}$, that is determined according to the programming of the AFS system as described above or according to any AFS algorithm known in the art. Where outcomes of steps 142 and 150 are both positive but the voltage is not found 154 to be low, an adjustment to $A_{AFS}$, $A_{SAC}$, may be determined at step 156 according to the SAC algorithm to prevent steering catch. Accordingly, the controller 12 will cause the steering gear 8 to move the road wheels to an angle $A_{RWA}$ corresponding to a compensated steering angle 7 approximating (e.g., within 5 percent of) $A_{SW}+A_{AFS}-A_{SAC}$.

Where away from center movement is detected 142, the vehicle speed is found 150 to be low, and the voltage is found 154 to be low, the controller 12 will cause the steering gear 8 to move the road wheels to an angle $A_{RWA}$ corresponding to a compensated steering angle 7 approximating $A_{SW}+A_{AFS}-\text{Min}(f_A(A_{SAC}), A_{MAX})$, where $f_A(\ )$ is an amplification applied due to the detected low voltage and $A_{MAX}$ is the maximum permitted reduction according to the maximum reduction or maximum reduction rate as described above with respect to steps 16-166. The value of $f_A(\ )$ may be a function of $A_{SAC}$ as well as one or more parameters defining the steering state. As noted above the amplification may be applied by multiplying $A_{SAC}$ by a multiplication factor M, adding an amplification factor B, or any other function tuned to achieve a desired reduction in steering catch in low voltage situations.

As is apparent from the foregoing description, the amount of reduction in the superimposition angle 6 for the amplified SAC algorithm of step 158 will be greater than the reduction determined for the unamplified SAC algorithm of step 156 for the same steering state, i.e. the same road wheel angle, steering wheel angle, steering wheel speed, steering rack speed, etc. In particular, the reduction in the superimposition angle 6 may be determined at step 156 according to any SAC algorithm known in the art, such as those described in the documents incorporated by reference. The amplified reduction of step 158 may be determined with respect to a reduction determined according to the same SAC algorithm as step 156.

Figure 4B:
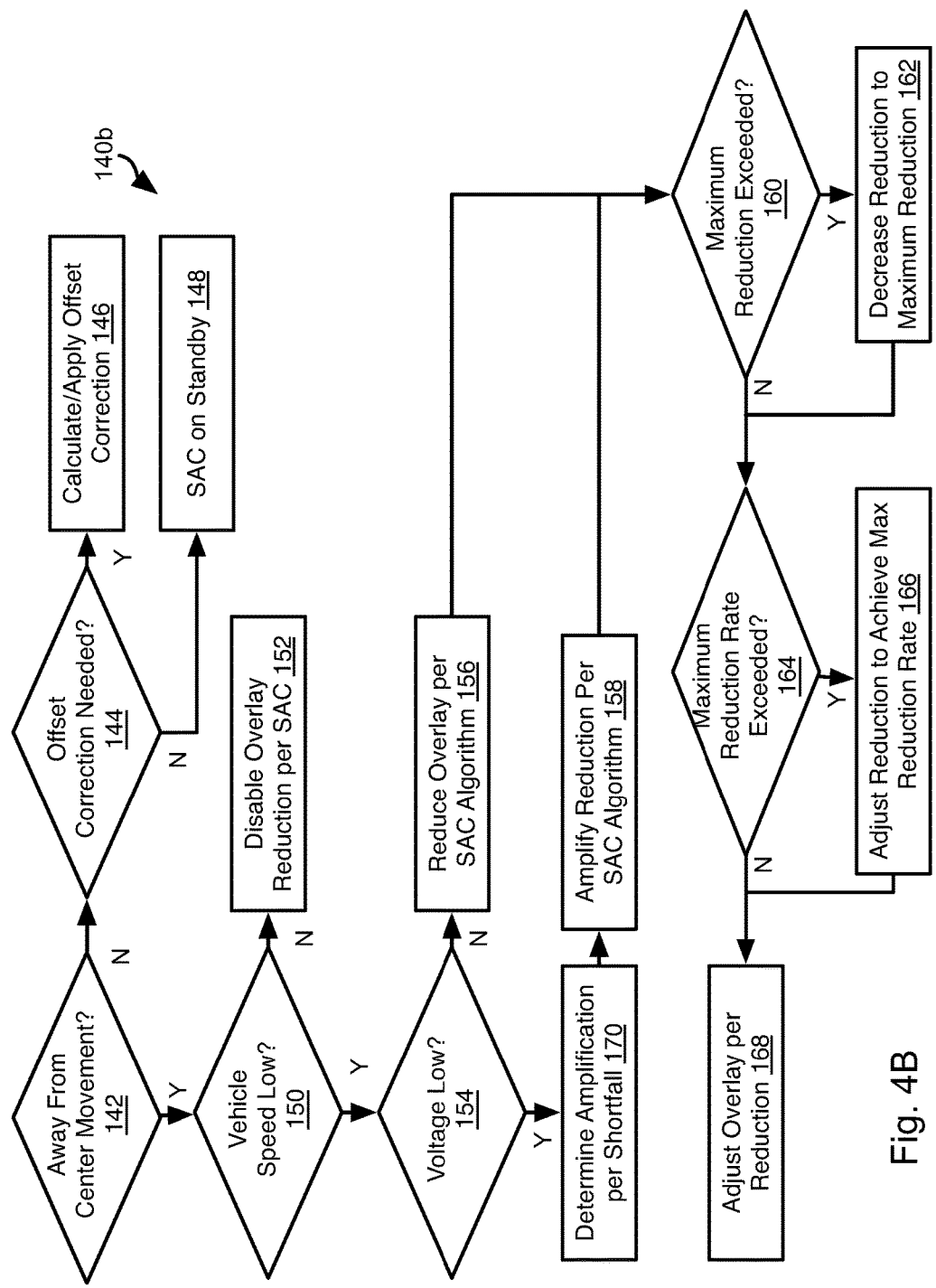
FIG. 4B is a process flow diagram of an alternative method for selectively enabling an SAC algorithm in accordance with an embodiment of the present invention.

FIG. 4B illustrates an alternative method 140b in which the amount amplification of the reduction in the overlay angle 6 may vary depending on a shortfall in the voltage. For example, if the voltage is found 154 to be low, the method 140b may include determining 170 the amount of amplification, e.g. the value of M and/or B, according to a voltage shortfall below the voltage threshold, such that the amount of amplification increases with size of the shortfall. The amplified reduction may then be determined at step 158 using the amplification determined at step 170. The subsequent steps 160-168 may then be performed in the same manner as for the method 140a.

In some embodiments, a plurality of sub-thresholds $T_i$, i=1 to N may be defined, each having a corresponding amplification factors $M_i$ and/or $B_i$. The amplification determined at step 170 may therefore be the one or more amplification factors $M_i$ and/or $B_i$ corresponding to the lowest threshold $T_i$ below which the measured voltage falls. In other embodiments, the values of M, B, or other values defining an amplification function, may be a function of either the measured voltage, e.g., a filtered version of the measured voltage, or an amount by which the measured voltage falls below the voltage threshold.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for a vehicle comprising:
sensors including a steering wheel angle sensor, voltage sensor, and speed sensor;
an overlay motor;
a steering gear coupled to the overlay motor; and
a controller programmed to—
receive signals from the sensors;
evaluate whether (a) an output of the voltage sensor is below a voltage threshold;
evaluate whether (b) an output of the speed sensor is below a speed threshold;
calculate a superimposition angle based according to first algorithm that calculates the superimposition angle according to a steering wheel angle from the steering wheel angle and speed according to the speed sensor; and
if (a) and (b);
reduce the superimposition angle by a first reduction amount according to a second algorithm that calculates the first reduction amount according to a steering wheel speed as measured by the steering wheel angle sensor; and
activate the overlay motor to input a compensated steering angle to the steering gear according to the superimposition angle reduced by the first reduction amount.

2. The system of claim 1, wherein the controller is further programmed to:
evaluate whether (c) a steering wheel angle from the steering wheel angle sensor indicates movement away from a center position; and
only if (b) and (c), reduce the superimposition angle by the first reduction amount and activate the overlay motor to input the compensated steering angle to the steering gear according to the superimposition angle reduced by the first reduction amount.

3. The system of claim 2, wherein the controller is further programmed to, if (c) and at least one of (a) and (b) is not true, refraining from reducing the superimposition angle according to the first reduction amount.

4. The system of claim 2, wherein the controller is further programmed to:
if (a), (b), and (c), reduce the superimposition angle by a smaller of the first reduction amount and a maximum reduction.

5. The system of claim 2, wherein the controller is further programmed to:
if (a), (b), and (c), reduce the superimposition angle by a smaller of (a) the first reduction amount, (b) a maximum reduction, and (c) an amount effective to achieve a time varying rate of change in the first reduction amount that is less than a maximum rate.

6. The system of claim 2, wherein the controller is further programmed to evaluate whether (a) an output of the voltage sensor is below a voltage threshold by evaluating whether a filtered version of the output of the voltage sensor is below the voltage threshold.

7. The system of claim 2, wherein the controller is further programmed to:
if (a) is not true and both of (b) and (c) are true, reduce the superimposition angle by a second reduction amount according to a third algorithm that calculates the second reduction amount according to the steering wheel speed, the second reduction amount being greater than the first reduction amount according to the second algorithm for a same steering wheel speed.

8. The system of claim 1, wherein the second algorithm further calculates the first reduction according to the output of the voltage sensor such that the first reduction amount increases with an amount by which the output of the voltage sensor falls below the voltage threshold.

9. The system of claim 2, wherein the controller is further programmed to:
if not (c), evaluate whether (d) a current superimposition angle is offset relative to an unadjusted superimposition angle as output by the first algorithm for a current output of the steering wheel angle sensor;
if (d), activate the overlay motor effective to reduce a difference between the current superimposition angle and the unadjusted superimposition angle.

10. The system of claim 1, wherein the second algorithm is effective to reduce steering rack speed relative to the first algorithm effective to prevent increase in steering wheel torque due to high steering wheel angular speeds.

11. A method comprising:
providing a vehicle including a steering wheel, road wheels, a steering mechanism coupling the steering wheel to the road wheels, an electric actuator coupled to the steering mechanism, a battery, and a controller;
evaluating, by the controller, whether (a) a voltage from the battery is below a voltage threshold and (b) a vehicle speed is below a speed threshold;
when (a) is true and (b) is not true calculating, by the controller, a superimposition angle according to a first algorithm that decreases the superimposition angle with increasing speed of the steering wheel; and
when (a) and (b) are both true, calculating, by the controller, the superimposition angle according to a second algorithm that decreases the superimposition angle with increasing speed of the steering wheel to a greater extent than the first algorithm; and
powering the electric actuator to control a road wheel angle (RWA) of the road wheels, the RWA being a function of a position of the steering wheel and the superimposition angle.

12. The method of claim 11, further comprising:
only when all of (a), (b), and (c) are true, where (c) includes movement of steering wheel effective to urge the steering gear away from a center position, calculating the superimposition angle according to the second algorithm.

13. The method of claim 12, further comprising:
calculating an overlay angle according to a third algorithm that is a function of a speed of the vehicle;
when (a), (b), and (c) are true and a reduction according to the second algorithm is greater than the maximum reduction, calculating the superimposition angle as the overlay angle less the maximum reduction.

14. The method of claim 13, wherein the second algorithm comprises
when (a), (b), and (c) are true, calculating, by the controller, the superimposition angle as the overlay angle less a smaller of (i) the reduction according to the second algorithm, (ii) the maximum reduction, and (iii) an amount effective to achieve a time varying rate of change of reduction to the overlay angle that is less than a maximum rate.

15. The method of claim 11, wherein detecting (a) comprises evaluating whether a filtered version of an output of a voltage sensor is below the voltage threshold.

16. The method of claim 11, further comprising, when (a) is not true but (b) and (c) are true, (c) being movement of steering wheel effective to urge the steering gear away from a center position:
- calculating, by the controller, the superimposition angle according to the first algorithm.

17. The method of claim 16, wherein the second algorithm comprises calculating a reduction according to the first algorithm, applying an amplification to the reduction to obtain an amplified reduction, and calculating the superimposition angle according to the amplified reduction.

18. The method of claim 11, further comprising:
- determining, by the controller, that (c) movement of a steering wheel effective to urge a steering rack toward a center position;
- determining, by the controller, that (d) the superimposition angle is offset relative to an overlay according to a third algorithm for a current output of a steering wheel angle sensor, the third algorithm calculating the overlay according to the current output of the steering wheel angle sensor and a speed of the vehicle;
- in response to determining (c) and (d), activating, by the controller, the electric actuator effective to reduce a difference between the superimposition angle and the overlay angle.

19. The method of claim 11, wherein the second algorithm is effective to reduce rack speed of the steering mechanism relative to the first algorithm effective to prevent increase in steering wheel torque due to high steering wheel angular speeds.

* * * * *